July 14, 1942.  K. M. HAMMELL  2,289,776
THERMOSTATIC CONTROL FOR ELECTRICAL APPLIANCES
Filed Nov. 29, 1940  2 Sheets-Sheet 1
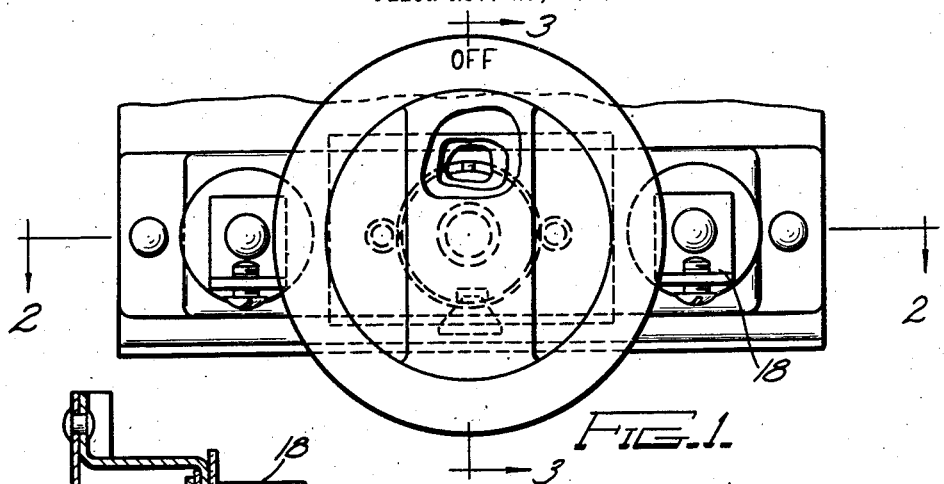
FIG.1.
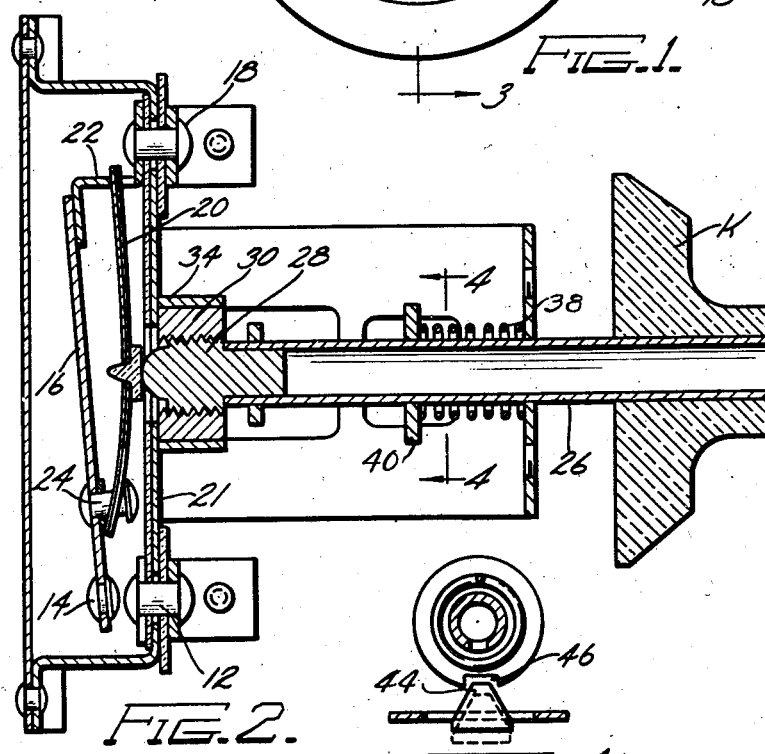
FIG.2.
FIG.4.
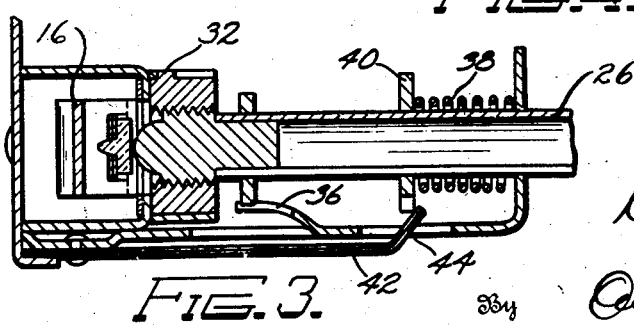
FIG.3.
Inventor
Kemper M. Hammell
By Owen & Owen
Attorneys July 14, 1942.  K. M. HAMMELL  2,289,776
THERMOSTATIC CONTROL FOR ELECTRICAL APPLIANCES
Filed Nov. 29, 1940   2 Sheets-Sheet 2
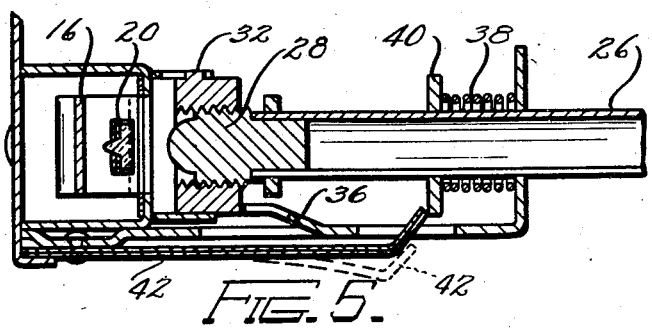
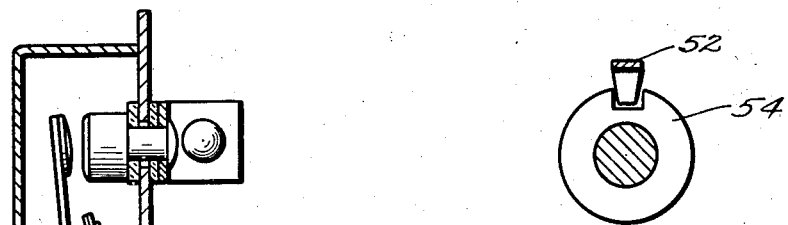
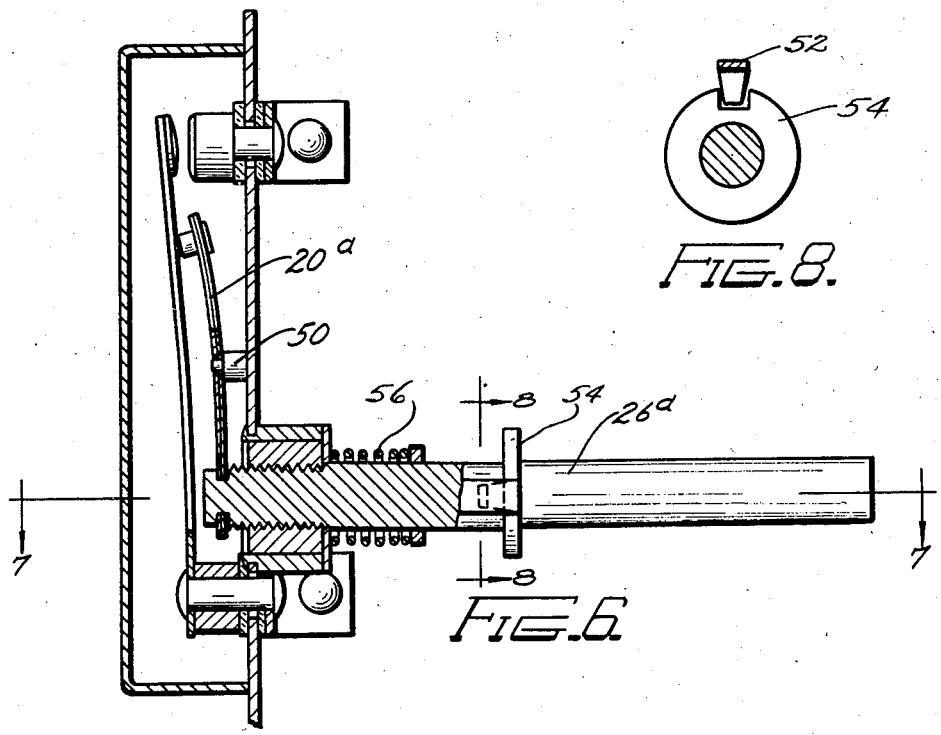
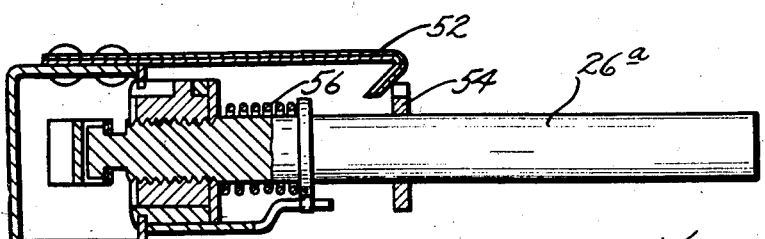
Inventor
Kemper M. Hammell
By Owen & Owen
Attorneys Patented July 14, 1942

2,289,776

UNITED STATES PATENT OFFICE 2,289,776

THERMOSTATIC CONTROL FOR ELECTRICAL APPLIANCES

Kemper M. Hammell, Toledo, Ohio, assignor to The Swartzbaugh Manufacturing Company, Toledo, Ohio, a corporation of Ohio Application November 29, 1940, Serial No. 369,502

5 Claims. (Cl. 200—139)

This invention relates to thermostatic controls for electrical appliances, and is particularly directed to a control for cooking appliances in which a pre-heat period is desirable.

In the use of electric cooking appliances such as roasters and ovens, it is frequently desirable to maintain the temperature of the appliance at a relatively high point, for example 550°, during which time meat may be seared, and then to continue the cooking operation at a reduced temperature. In the past this has been accomplished by means of two thermostats separately controlled in combination with various complicated circuits and circuit closing devices. While such complicated devices may be satisfactory for use in expensive ranges and the like, they are needlessly complicated for use with ordinary electric roasters.

The present invention has for its primary object the provision of a simple and efficient thermostatic control for an electric roaster or the like, which may be set to give an initial period of elevated temperature and which will automatically revert to the lower cooking temperature chosen by the operator.

Another object of the invention is the provision of a control of this character in which a single shaft and control knob is used to simplify the operations.

Other objects and advantages of the invention will become apparent as the description proceeds, reference being had to the accompanying drawings, in which—

Figure 1 is an enlarged front elevation, with parts broken away, of a thermostatic control embodying the present invention; Fig. 2 is a section on the line 2—2 of Fig. 1; Fig. 3 is a section on line 3—3 of Fig. 1; Fig. 4 is a section on lines 4—4 of Fig. 2; Fig. 5 is a sectional view, similar to Fig. 3, with the parts in the pre-heat set position; Fig. 6 is a longitudinal sectional view of a modified form of the invention, and Figs. 7 and 8 are sections on lines 7—7 and 8—8, respectively, of Fig. 6.

Referring to the drawings, and particularly to Fig. 2, the present invention is shown applied to a thermostatic control for an electric circuit including a stationary contact 12 and a movable contact 14, the latter being carried on the end of a spring arm 16 which is connected at its fulcrum end to a binding post 18. The binding post 18 and the similar binding post 19 for the stationary contact 12 are carried by a suitable frame member 21. A bimetallic member 20 is provided which has one end bearing against a fixed element 22 and its opposite end slidably connected to a pin 24 carried by the spring 16. Thus, as the bimetallic element flexes, it will overcome the force of the spring 16 and open the circuit between contacts 12 and 14. When the bimetallic element is straightened, in its normal position, the spring 16 moves to close the circuit between the contacts. Thermostatic switches of this nature are well-known in the art and are widely used.

The adjustment for the bimetallic element which determines the degree of flexure required to open the circuit includes a shaft 26 which carries a threaded tip piece 28 which abuts the central portion of the bimetal when in its normal position. The tip piece cooperates with internally cut threads in a bushing 30, which latter is fixed against rotation by any suitable means such as a key 32. The key 32 slides in a slotted boss 34 which is fixed to the frame 21, so that the entire adjustment assembly, including shaft 26, its threaded tip piece 28, and the associated bushing 30, is thus slidable in and out of the boss 34. The outward sliding movement is limited by a stop 36 formed from a forward extension 37 of the frame of the thermostat, and a spring 38 is provided which is disposed between the frame and a collar 40 fixed to the shaft 26. It will thus be seen that the adjusting parts are biased to their inner positions in which the bimetal engages the tip piece 28.

To adjust the thermostat, the operator turns the control knob K, and thus changes the relative location of the tip piece 28 and hence the initial flexure of the bimetal 20. With the parts thus far described, the thermostat operates in the usual manner, merely opening and closing the circuit at the temperature for which it has been previously calibrated and adjusted.

When the thermostatic elements so far described are to be used, for example, in cooking a roast which it is desired to sear the meat first at a temperature of perhaps 500° to 600°, it is necessary for the operator to turn the thermostat to its highest position during the searing period and later reduce it to the temperature at which the cooking is to be finished, usually between 300° and 350°. This requires that the operator keep constantly in mind the fact that the appliance is working at the elevated temperature and remember to reduce the temperature after a predetermined time. The present invention accomplishes this step automatically.

A second bimetallic element 42 is provided and is fixed at one end to the frame of the thermostat and has its free end bent upwardly to form a detent 44 which is normally adjacent the collar 40 carried by the shaft 26. The normal position of the detent 44 is such that when collar 40 is disposed behind it, as shown in Fig. 6, considerable flexure of the second bimetallic element 42 is required to released the collar. In order to position the collar 40 behind the detent 44, the knob K is pulled outwardly so that the entire adjusting assembly, including shaft 26, collar 40 and tip piece 28 moves outwardly until collar 40 is disposed behind the detent 44 which then acts as a latch to prevent return of the adjusting assembly under the influence of spring 38. The collar 40 is slotted as at 46 to provide an emergency return so that the operator may release the adjusting assembly from its latched position at any time. With the tip piece 28 removed from its normal position the bimetal 20 can undergo an extreme flexure without opening the contacts 12 and 14 because it has no fulcrum point.

The calibration of the bimetallic element 42 is such that a predetermined time and temperature is required to flex it sufficiently to move the detent 44 from the path of collar 40. For example, a sustained temperature of 550° over a period of fifteen minutes may be required to release the collar and permit spring 38 to return the adjusting mechanism to its normal position. However, as soon as the collar 40 is released the tip piece 28 will return against the bimetallic element 20, which by this time has flexed considerably and will open the circuit between the contacts 12 and 14. The remainder of the cooking operation is then conducted under the influence of the bimetallic element 20 in the normal manner and at the temperature indicated by the position of the knob K.

The operation of the parts thus far described is apparent. When the user of the appliance desires to establish a high temperature for a short time to be followed by the lower temperature, the knob K is first pulled out so that collar 40 is disposed behind the detent 44, and the knob is turned to indicate the lower cooking temperature. The circuit is thus established between contacts 12 and 14 since spring 16 tends to close the contacts. The circuit will remain closed because the bimetallic element 20 is unable to overcome the force of the spring, having no fulcrum point intermediate its ends. The temperature of the appliance thus increases to the searing temperature. After the bimetallic element 42 has become sufficiently heated, the detent 44 is withdrawn from contact with the collar 40 and the spring 38 returns the parts to normal position, after which the operation is influenced entirely by the bimetallic element 20 and the temperature at which the cooking will be conducted is indicated by the position of the knob K.

A modified form of the invention is shown in Figs. 7, 8, 9 and 10. The difference between this modified form and the form thus far described is in the manner in which the main bimetallic element 20a is mounted. Whereas in the form previously described the adjusting mechanism abutted the central portion of the bimetal, in this form the adjusting mechanism operates on one end of the bimetal and the bimetal is fulcrumed on a stationary element 50 carried by the thermostat housing. In order to maintain the circuit closed, so that the bimetallic element 20a is unable to open it, it is necessary to push in on the control shaft 26a. In this form the pre-heat bimetallic element forms a hookshaped detent 52, which cooperates with a collar 54 carried by the shaft 26a to hold the shaft in its innermost position against the tension of spring 56.

In the operation of this form, the user pushes shaft 26a in until detent 52 engages the collar 54, and turns the shaft to set the thermostat for the temperature at which the major portion of the cooking is to be done. The circuit remains closed until the bimetallic element 52 releases the mechanism, after which time the thermostat operates in the usual manner under the influence of the bimetallic 20a.

While the invention has been described in connection with two specific forms, it will be appreciated that various changes in structure will suggest themselves to those skilled in the art, and that such changes are properly within the scope of the invention as defined in the appended claims.

What I claim as new and desire to secure by United States Letters Patent is:

1. A thermostatic control for electric circuits comprising thermostatic means for opening a circuit when the controlling temperature reaches a predetermined point and reclosing the circuit when the controlling temperature drops below a predetermined point, a manually movable member controlling the thermostatic means when in normal position and movable to an abnormal position in which it renders the thermostatic means inoperative to open the circuit, resilient means urging the member towards normal position, a latch for holding the member in abnormal position, and means releasing the latch when the controlling temperature reaches a predetermined point above that at which said thermostatic means is set to operate normally.

2. A thermostatic control for electric circuits comprising thermostatic means for opening a circuit when the controlling temperature reaches a predetermined point and reclosing the circuit when the controlling temperature drops below a predetermined point, a manually movable stem controlling the thermostatic means when in normal position and movable to an abnormal position in which it renders the thermostatic means inoperative to open the circuit, resilient means urging the stem towards normal position, cooperating latch elements for holding the stem in abnormal position, one of said elements being carried by said stem and the other being a thermostatic element normally in the path of said first latch element but movable out of its path at a predetermined elevated temperature to release said stem from the latched inoperative position when the controlling temperature reaches a predetermined point above that at which said thermostatic means is set to operate normally.

3. A thermostatic control for electric circuits comprising thermostatic means for opening a circuit when the controlling temperature reaches a predetermined point and reclosing the circuit when the controlling temperature drops below a predetermined point, a manually movable member controlling the thermostatic means when in normal position and movable to an abnormal position in which it renders the thermostatic means inoperative to open the circuit, resilient means urging the member towards normal position, a collar carried by the member, and a thermally responsive detent cooperating with said collar to act as a latch for holding the member in abnormal position and operative to release the member when the controlling temperature reaches a predetermined point above that at which said thermostatic means is set to operate normally.

4. A thermostatic control for electric circuits comprising thermostatic means for opening a circuit when the controlling temperature reaches a predetermined point and reclosing the circuit when the controlling temperature drops below a predetermined point, a manually movable member controlling the thermostatic means when in normal position and movable to an abnormal position in which it renders the thermostatic means inoperative to open the circuit, resilient means urging the member towards normal position, a latch for holding the member in abnormal position, means releasing the latch when the controlling temperature reaches a predetermined point above that at which said thermostatic means is set to operate normally, and an emergency release means for said latch.

5. A thermostatic control for electric circuits comprising thermostatic means for opening a circuit when the controlling temperature reaches a predetermined point and reclosing the circuit when the controlling temperature drops below a predetermined point, a manually movable member controlling the thermostatic means when in normal position and movable to an abnormal position in which it renders the thermostatic means inoperative to open the circuit, resilient means urging the member towards normal position, a collar carried by the member, a thermally responsive detent cooperating with said collar to act as a latch for holding the member in abnormal position and operative to release the member when the controlling temperature reaches a predetermined point above that at which said thermostatic means is set to operate normally, and said collar being slotted in one position wherein said detent is ineffective so that an emergency release for said latch is provided.

KEMPER M. HAMMELL.